United States Patent
Lu et al.

(10) Patent No.: US 8,122,172 B2
(45) Date of Patent: Feb. 21, 2012

(54) PORTABLE INFORMATION SECURITY DEVICE

(75) Inventors: Zhou Lu, Beijing (CN); Huazhang Yu, Beijing (CN)

(73) Assignee: Feitian Technologies Co., Ltd., Beijing (CN)

(*) Notice: Subject to any disclaimer, the term of this patent is extended or adjusted under 35 U.S.C. 154(b) by 997 days.

(21) Appl. No.: 11/963,011

(22) Filed: Dec. 21, 2007

(65) Prior Publication Data
US 2008/0163350 A1 Jul. 3, 2008

(30) Foreign Application Priority Data
Dec. 29, 2006 (CN) .......................... 2006 1 0169855

(51) Int. Cl.
*G06F 13/00* (2006.01)
*G06F 13/14* (2006.01)
*H04L 9/32* (2006.01)

(52) U.S. Cl. .......................... 710/107; 710/305; 713/173
(58) Field of Classification Search .................. None
See application file for complete search history.

(56) References Cited

U.S. PATENT DOCUMENTS
| | | | |
|---|---|---|---|
| 2006/0161716 A1* | 7/2006 | Lin | 710/313 |
| 2008/0015995 A1* | 1/2008 | Chen | 705/50 |
| 2008/0147821 A1* | 6/2008 | Dietrich et al. | 709/216 |

* cited by examiner

*Primary Examiner* — Krista Zele
*Assistant Examiner* — Azizul Choudhury
(74) *Attorney, Agent, or Firm* — Hammer & Associates, P.C.

(57) ABSTRACT

The invention discloses a portable information security device in the security field. In order to solve the problem that the USB Key transfers data at low speed and may occupy more CPU resources with USB master/slave protocol, and to meet the demand on development of the next generation of interface technology, the invention provides a portable security device, based on serial ATA protocol, comprising an eSATA interface unit, a memory unit, a privilege management unit, an algorithm unit and a control unit.

7 Claims, 2 Drawing Sheets

PORTABLE INFORMATION SECURITY DEVICE

FIELD OF THE INVENTION

The invention relates to the information security field, and more particularly, to a portable information security device.

BACKGROUND OF THE INVENTION

In recent years, with the rapid development of the internet technology and e-business, more and more business activities turn to internet, for example, online office, digital bank, online shopping etc. At the same time, more and more information associated with privacy and business secrets need to be transferred over internet. However, malicious threats such as virus, hacker, and online transaction and phishing fraud compromise the security of online transactions seriously.

The information security device is a small hardware appliance with processor and memory and in connection with a computer through its data communication interface. The device has functions such as creation of a key, secure storage of the key, predetermination of encryption algorithm. The information security device makes key-related operation inside itself with the anti-attack feature, therefore it is safer. Generally, the information security device is in connection with the host through USB (Universal Serial Bus) interface, so it is usually called USB KEY or USB Token. The information security device manufacturer, software system vendor or end user can store some important information into the information security device in order to ensure the security or prevent it from being neglected. At present, the relatively high-end information security device is programmable, this means that, the device can run those codes pre-stored in it.

A conventional information security device has a built-in security design chip to ensure information security. Besides for those features owned by universal embedded micro-controller, the security design chip has more advantages on security. The chip makes some special arrangements on its structure in aspect of security. For example, the chip uses a specific security kernel, which supports multiple states with different privilege definition, to manage the access privileges of hardware resources. The kernel also supports randomization of instruction cycle, and its interruption system can finish the conversion of chip state and thereby control the security level of different layers in order to support the realization of the multi-application. Further, the kernel may has a MMU (Memory Management Unit) used to separate logic address from the physical address, and to set up address mapping. As a result, the MMU supports the design realization of multi-application, security and organically forms a hardware firewall along with different states supported by the kernel. The interruption system of the kernel can support the transfer and switch of the interface and privilege between the system database and client program. The kernel can use the non-volatile storage media as well. Generally speaking, the security design chip will be required to be complied with relative standards, and to pass the corresponding validations, in order to ensure its security, such as TCG TPM v1.2 specification, ISO 15408 international standard, standard of the State Password Administration Committee of China etc. At present, there are various security chips to choose, among which the ST19WP 8 micro-controller of ST Semiconductor has acquired the Common Criteria EAL5+ certificate, it is the highest standard of this type of products with ISO 15408 standard.

The conventional information security device has built-in security design chips to ensure the information security. Since the integrated circuit technique is applied to the information security field, the information security has got ensured further. The chip specially used to information security protection, based on the integrated circuit technology, is called security design chip. The chip processes the protected information by the following three methods: firstly, implement the information processing algorithm(s) with hardware completely (logic encryption); secondly, implement the information processing algorithm(s) with software (intelligence) completely; thirdly, implement the information processing algorithm(s) by combining software and hardware (programmable logic encryption). At present, the most widely-used hard disk interface in computer system is the IDE (Integrated Drive Electronics) interface, shortened as IDE interface. The IDE interface, or more accurately, the ATA (Advanced Technology Attachment) interface, uses a parallel interface mechanism and is also called the parallel ATA interface. This interface technology originated in 1986 and formed a standard in 1988, which provides a specification for attaching the disk to a personal computer. In recent years, in order to meet the requirement of higher access speed of a processing unit to drive data, with the constant development of ATA interface technology, various standards have been set up, such as ATA/ATAPI, EIDE, ATA-2, high-speed ATA, ATA-3, Ultra ATA, Ultra DMA, ATA/ATAPI-4, ATA/ATAPI-5, ATA/ATAPI-6 etc. Now the parallel ATA interface is in dominant position between hard disks inside a desktop and a notebook PC due to its simplicity and low cost. However, the parallel ATA has many disadvantages, making people so boring on continuous improving its performance. Those disadvantages include: numerous pins, cables with 40 pins and 80 chips along with short in lengthen, inconvenient hard disk access, unable to meet the cooling requirement of a system. Along with other features of parallel ATA interface, which all together contribute to the slow development of data transfer rate of the interface in the past. As a result, the parallel ATA is already close to its designed maximum data transfer rate, unable to meet the further requirement of computer data transfer rate.

In consideration of those above-mentioned disadvantages, in order to meet the requirement of developing the next-generation interface technology, the serial ATA interface becomes the next-generation ATA standard. SATA (Serial Advanced Technology Attachment) interface technology, namely Serial ATA, is a new technology in storage field being developed in recent years. Serial ATA packs bits of data with serial structure, and then transfers them to the host in group with higher speed than parallel ATA.

SATA interface can provide the following advantages:
1. High-Speed

Few of the present parallel ATA interface can reach the maximum bandwidth of data line. Even the ATA/133 hard disk can not reach the transfer rate of 133 MB/S actually, just with stable transfer rate of 60 MB/S at most, while the serial ATA can reach the highest transfer rate of 600 MB/S.

2. Point-to-Point Communication

The serial ATA uses the point-to-point transfer protocol, so the master/slave problem does not exist. In this case each driver can not only use independent bandwidth, but also achieve more convenience in extending ATA device. As a result, users will be no longer worried about configuration of master/slave jumpers. They just need to increase the number of channels, devices will be connected together.

3. Hot Plug Support

SATA supports hot plug, the same as USB and IEEE 1394, which can add or remove a hard disk when power is still on without damaging the hard disk and controller.

4. Built-in Data Check

SATA uses brand-new CRC (Cyclic Redundancy Check) protection systems in both ends of the transfer bus. The bidirectional CRC of SATA seems less useful for common home, but extremely important for high-end workstations and servers.

SATA interface, developed from parallel ATA interface, has less pins, softer cables, longer access cables for hard disks than those of parallel ATA, convenient for hard disks to access a host, along with hot-plug support. Additionally, less pins in SATA interface benefit system design of main boards comprising chips and other integrated semiconductor parts, making them easy to put outside and move, which meets the demand on developing the next-generation interface technology.

In the aspect of removable storage, eSATA (External Serial ATA) technology emerges, which means that, the SATA interface is transferred from inside the main board to outside of the chassis. The eSATA, as an external extension standard of SATA interface, has significant advantages. Comparing with two conventional external interfaces of USB2.0 and IEEE1394, eSATA boasts of excellent data transfer capability. The transfer rate of eSATA can reach 300 MB/s, far higher than 480 Mbp/s of USB2.0 and 400 Mbp/s of IEEE1394. Moreover, eSATA still supports hot-plug, this means that, users can configure or remove SATA device without shutting down the computer. With the emergence of eSATA, the transfer rate of an external interface exceeds far from the internal rate of devices such as hard disks for the first time. Recently, storage device manufacturers comprising Seagate turn its main businesses to external hard disks. At CES2006, Seagate debuts its keyboard back-up series of external hard disks, among which the interface speed of 500 GB ones is up to 300 MB/s. Meanwhile, companies, such as Data-Tec, I-O DATA, launched their own eSATA external hard disks or DVD burners in succession, while there are the main boards with eSATA interface emerged on sale, like 775XFire-eSATA2 of HUA QING and P5W DH of ASUS etc. Besides that, Seagate has designed and produced eSATA external hard disks.

At present, the widely used USB Key has the following disadvantages:

1. Because the highest transfer rate of the present USB can only reach 10 MB/S, the transfer rate is limited greatly.

2. USB technology, based on a master/slave transfer protocol, may occupy more CPU resources compared with the point-to-point transfer protocol.

SUMMARY OF THE INVENTION

In order to increase the data transfer rate of USB Key, and to save the CPU resources occupied by USB master/slave transfer protocol, also to further development of the next-generation of interface technology, the invention provides a portable information security device based on external serial ATA protocol, this means that, the external serial ATA technology is integrated into the popular information security devices. The information security device comprises an eSATA interface unit, a memory unit, a privilege management unit, an algorithm unit and a control unit.

The eSATA interface unit is used to connect the information security device with a host through an eSATA interface and communicate between the information security device and the host in accordance with external serial ATA protocol, and provide an interface for transmitting data to and receiving data from a bus defined by eSATA. The memory unit is used to store internal data of the information security device.

The privilege management unit is used to manage and control privileges of a user that attempts to access the information security device by the user's identity.

The algorithm unit is used to conduct encryption/decryption operations.

The control unit is used to control communications between the eSATA interface unit and the host, and to control the privilege management unit with access to the information security device, also to control and process the data stored in the memory unit.

The memory unit is further used to store key data consisting of digital certificates, keys and private user data.

The memory unit is further used to store user program to allow for writing and calling of user-defined algorithm(s).

The algorithm unit conducts encryption/decryption operations with the key data.

The control unit is a security design chip consisting of a smart card chip.

One or more of the control unit, memory unit, privilege management unit and eSATA interface unit, are integrated into a single chip. The chip is a security design one including a smart card chip.

The eSATA interface unit is a separate eSATA protocol conversion chip.

It has advantages of:

1. The information security device makes communication with a host by eSATA protocol, and the transfer rate of eSATA is up to 300 MB/s, so the transfer rate of data is increased greatly.

2. The eSATA uses point-to-point transfer protocol, so the master/slave problem does not exist, thereby saving the resource.

3. The eSATA supports hot-plug, the disconnection and connection between the information security device and a computer is of no need to consider the operating status of a computer. That is convenient, also meets the demands on the development of the next-generation technology.

DETAILED DESCRIPTION OF THE PREFERRED EMBODIMENTS

Figure 1:
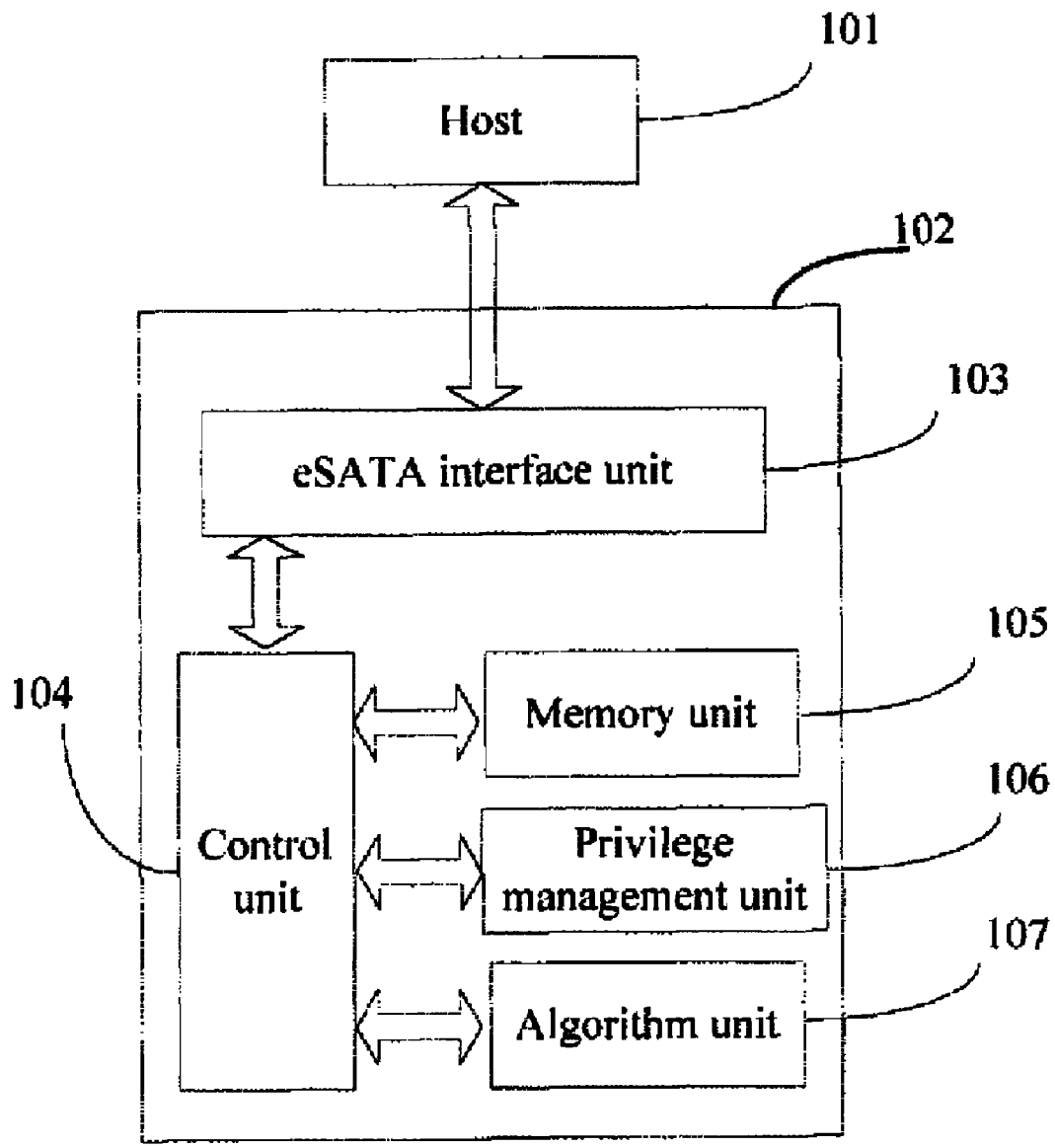
FIG. 1 is a block diagram of the portable information security device supplied by the embodiment of the invention.

A further description of the invention with figures and embodiments will be made as following, but that is not a limit to the invention. As shown in FIG. 1, the invention provides an information security device 102, based on the eSATA protocol, comprising an eSATA interface unit 103, a control unit 104, a memory unit 105, a privilege management unit 106 and an algorithm unit 107. The control unit 104 is separately connected to eSATA interface unit 103, memory unit 105, privilege management unit 106 and algorithm unit 107. The information security device 102 based on eSATA protocol communicates with the host 101 through eSATA protocol.

The control unit 104 is used to control and process data. The control unit 104 has a built-in security module used to ensure information security, and it can be a security design chip, for example, a smart card chip. The control unit 104 first communicates with the host 101 through eSATA interface unit 103, next manages and controls the access to information security device 102 through privilege management unit 106, then controls and processes the data stored in memory unit 105. The eSATA unit 103 is used to make connection with the host 101, and to make communication with the host 101 in line with eSATA protocol, also to provide an input/output interface for the information security device 102. Through eSATA unit 102 the data is transferred to and received from a bus defined by eSATA. The eSATA unit 103 supports eSATA functions complying with eSATA standard and performs functions of eSATA interface, needed by the information security device 102, such as identification, enumeration, configuration and registration of the device on the eSATA bus.

The memory unit 105 is used to store internal data, and the key data comprising digital certificate, key and private data etc, also used to store client program which is designed to write & call the user-defined algorithm(s), such as the predetermined encryption and decryption algorithm or user-defined algorithm(s) or part of user codes.

The privilege management unit 106 is used to control and manage the access privilege of the user according to the user identity information when accessing the information security device.

The algorithm unit 107 is used to process encryption and decryption. The memory medium of memory unit 105 comprises one or more of RAM, ROM, EPROM, EEPROM or Flash memory.

The eSATA interface standard supports the hot-plug, the same as USB and IEEE1394. And adding or removing the information security device can be done when the host is still power on, and would not damage the information security device 102 and the memory unit 105 inside the device, so the eSATA interface is convenient for a user to operate. In practical production design, there are many methods to choose, for example, the function of the control unit can be realized with a security design chip; functions of the memory unit, privilege management unit and algorithm unit can be realized with a memory chip; the function of the eSATA interface unit can be realized with an eSATA protocol conversion chip. And all these functions can be realized with integration of one or more of control unit, memory unit, privilege management unit, algorithm unit and eSATA interface unit into one chip.

One preferred method of the embodiment of the invention is that using a smart card chip with eSATA interface to control and process data, and to communication between the information security device and a host, and to solve and process data received, also to access the privilege management unit. Moreover, the cryptographic algorithm programs are stored in a modifiable memory area of a smart card chip for subsequent operations such as functional upgrade. Private data, such as digital certificate, public key or private key, can also be stored in memory portion of a smart card chip when the key data is needed in applications like user authentication etc.

For a smart card chip with eSATA interface, the eSATA interface complying with eSATA (External Serial ATA) protocol, connects the information security device with a host, and communicates with the host in line with eSATA protocol, also provides the interface in which data is transferred to and received from eSATA definition bus. At present, the eSATA control chip complying with eSATA protocol, such as Si13531 from Silicon Image Inc., could provide an eSATA interface in line with eSATA protocol and the eSATA interface supports the highest transfer rate of 300 MB/s. Meanwhile, Silicon Image Inc. provides an eSATA interface control chip in line with eSATA protocol, such as Si13132, or Si13512.

When the information security device 102 is connected to a host through an eSATA interface in the smart card chip, the host supplies power to the information security device through the eSATA interface and the device is in normal use. In the method of using a smart card chip with eSATA to an information security device, due to the application of complete encapsulation, the overall performance of the system is improved.

When the information security device 102 is connected to the host 101, a standard SATA enumeration procedure is created, in which the host 101 configures the configuration mode of the information security device 102. In this embodiment, the interface between the information security device 102 and the host 101 applies eSATA standard, and makes cooperation with the operating system of the host to initialize the information security device according to the working flow of the eSATA interface protocol, and makes interface standard operation on the requirement of the operating system of a host, also configures the information security device 102. Then the information security device executes the corresponding instructions such as data mutual operation or authentication processing and code operation predetermination. The structure of the above-mentioned preferred method is just a particular instance of the invention. In a special embodiment, the eSATA interface unit 103 can also be configured in a separate eSATA protocol conversion chip. There are various types of protocol conversion chips for use. For example, the bridge chip for converting from USB protocol to eSATA protocol includes SPIF216A and SPIF215A from Sunplus Corp. Moreover the bridge chip for converting from PATA protocol to eSATA protocol is available.

The host 101 can be a desktop, a notebook, a server or a specific machine. The information security device based on eSATA protocol in the embodiment can also be connected to other peripherals which are not limited to a card reader, a communication device, a digital camera, a computer or other specific device.

Figure 2:
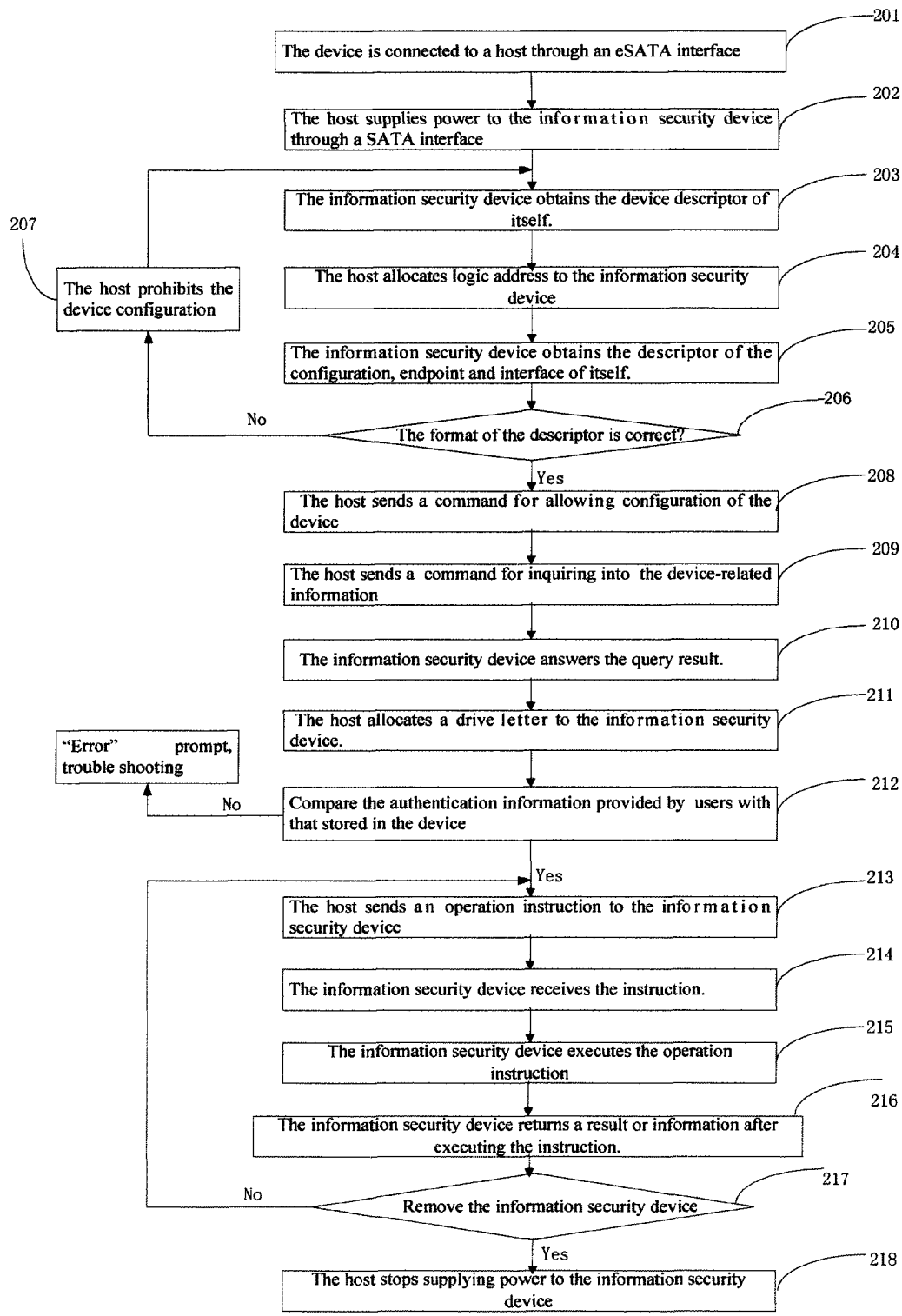
FIG. 2 is a flowchart of control of the information security device provided by the embodiment of the invention.

As shown in FIG. 2, a control method of the information security device based on eSATA protocol is provided as follows:

Step 201: the information security device is connected to a host through an eSATA interface.

Step 202: the host supplies power to the information security device through a SATA interface.

When a corresponding SATA interface connector of the host detects an access of the information security device, it will supply power to the device.

Step 203: the information security device obtains the device descriptor of itself.

The host sends a query instruction to the information security device for the descriptor of the device. The information security device obtains the device descriptor of itself from its eSATA interface unit in response to the query instruction. The device descriptor comprises a flag indicating that the information security device has one or more drive letters. The information security device returns the device descriptor of itself to the host.

Step 204: the host allocates logic address to the information security device.

After the host received the descriptor of the device, it allocates logic address to the information security device.

Step 205: the information security device obtains the descriptor of the configuration, endpoint and interface of itself.

The host sends a query instruction again for the descriptor of the configuration, endpoint and interface of the device. And the information security device obtains the above-mentioned descriptor according to the query instruction, and returns it to the host. The descriptor comprises the information of the maximal number of logic units supported, namely a flag showing the number of drive letters needed.

Step 206: verify whether the format of the descriptor is correct, if not, go to step 207; if correct, go to step 208.

Step 207: prohibit configuration of the device, and inquiry again, then go to step 203.

Step 208: the host sends a command for allowing configuration of the device.

The host sends a command to the information security device allowing configuration of the device. Then configuration of the information security device starts.

Step 209: the host sends a command for inquiring the device-related information.

The host sends a query instruction for the device-related information comprising the name of the device manufacturer and product etc., and runs a corresponding driver, then chooses the interface and pipeline and determines the transfer mode.

Step 210: the information security device answers the query result. The information security device answers the query instruction, and then returns the corresponding result.

Step 211: the host allocates a drive letter to the information security device.

The operating system of the host allocates one or more drive letters to the information security device on requirement of the information security device. Thus, the recognition and configuration of the information security device is completed.

Step 212: compare the authentication information provided by users with that stored in the information security device, if they are the same, go to step 213; otherwise prompt Error and turn to trouble-shooting.

Comparing the authentication information provided by users with that stored in the information security device and according to the result, nudging whether a user has the privilege of access to the information security device. The user can input PIN or biometrics for verifying the legitimacy of identity.

Step 213: the host sends an operation instruction to the information security device.

The host sends an operation instruction to the eSATA interface of the information security device for the service provided by the device.

Step 214: the information security device receives the instruction. The information security device receives operation instruction sent by the host through the eSATA interface inside the device.

Step 215: the information security device executes the operation instruction.

The information security device explains and executes the operation instruction.

Step 216: the information security device returns a result or information after executing the instruction.

The information security device returns a result to the host after executing the instruction, system information, operation data etc.

Step 217: the host detects whether a user removes the information security device. If so, go to 318, otherwise repeat executing the instruction until the information security device is removed and shut down.

Step 218: the host stops supplying power to the information security device.

After receiving a signal of removing and shutting down the information security device from a user, the host along with the information security device completes all operations and is shut down. In this case the connection between the information security device and the host was terminated.

When a user removes the information security device from SATA interface of the host, the operating system of the host automatically detects the remove, and then deletes the descriptor of the information security device.

In the above-mentioned processing, the information security device executes operation instructions at step 215 comprising:

1. Data Interacting Operation

The data mutual operation comprises encryption of write-in data or decryption of read-out data inside the information security device. The algorithm for encryption and decryption of data can be one or more of algorithms RSA, DES, 3DES, SCB2, SSF33, AES, and ECC. When encryption and decryption of data, the firmware program, in the program memory unit, makes use of the algorithm(s) stored in it to encrypt and decrypt data through the key stored in key data memory unit.

2. Authentication Information Processing

Authentication information processing primarily comprises storage and verification of password, signature and digital certificate, and management of privileges. Authentication information processing makes use of the digital certificate, key or user's private data stored in key data memory unit to execute secure authentication for:

a. Control of access to the network: control user's access to internet through recognition of the hardware information in the information security device or of user's authentication information stored in key data memory unit.

b. Verification and authentication of digital signature or credentials identifying sender of a file to prevent it from being tampered.

c. Password storage, storing user's password to low the risk when a user inputs the password by hand.

d. Remote log-on, of which websites such as those of banks make use to recognize the legalization of a user.

e. Control of access to a file, the access control information can be added to some files to prevent illegal access to or operation of the information security device.

f. Control of logging on a specific application system, the software system developers can apply the function to their products, namely log-on a specific application system automatically through the information security device.

The main function of using the information security device to make authentication is to protect the important data, sensitive data from being read out of the device all along. The advantages of using it are as follows:

a. It is no need for a user to remember the long password. The safe password must be a complicated enough string consisting of number and letter, and it must be changed regularly, while the trouble in changing it can be solved by using the information security device to store the password.

b. Provide a secure measure with dual-factor authentication. In this case, even though the password of a user or an information security device is lost, no risk is taken to the user.

c. The key is stored in a key data memory unit and can not be exported, thereby ensuring its security.

3. Predetermined Code

Predetermined code is stored in the program memory unit, which protects software. Predetermined code comprises pre-determination of user's software segments which can not be read out of the information security device and must run inside the device, communicating with the external software to control the software in sequence in order to ensure its proper operation. The predetermined code can realize the following functions to protect the software:

a. write files: write user's code segment or the data needed in running the segment.
b. read files: read data files in running the code segment except for the segment itself.
c. run files: the code segment written by the user is run in the information security device, and ensure all data and information in operation to be left in the device, but only return a result.

Predetermined code also comprises a predetermined application interface function of software protection which is one between the information security device and the software system developer. The application interface function is mainly used by the software system developer, has functions as follows:
a. open a device: open an information security device and establish the communication channel with it.
b. shut down the device: when the host does not use the device, shut down the device and delete the status information of the device.
c. send a command: realize all configuration of the information security device, namely realize all software protection functions.

The key of using predetermined code to protect software with the information security device is that the predetermined code or the program protected does not exist in the host, which boasts of advantages as follows:
a. prevent programs from illegal copy: programs in the host is not complete without software protection, this means that those programs can be used properly.
b. prevent programs from illegal trace or debugging: make the important code of software not run in the host, therefore all debug software can not acquire the operation status of programs.
c. prevent programs from dumping: the easiest way to crack software is in its running, the traditional shelling software is usually dumped by the memory, and then codes of it are restored.
d. prevent programs from being decompiled: no matter how perfect a decompiled technology is, the predetermined code segment can not be acquired.

In the control method, the firmware program stored in the program memory unit is used to recognize the device, and to wait for and receive data from the host, and to resolve and process the data, also to return the data to the host.

Those above-mentioned exemplary embodiments are only preferred ones of the invention, various changes and equivalents made by those skilled in the art in the technology scope of the invention should be protected by the invention.

The invention claimed is:

1. A portable information security device comprising:
an eSATA interface unit, for connecting the information security device with a host through an eSATA interface and communicating between the information security device and the host in accordance with external Serial ATA protocol, and providing an interface for transmitting data to and receiving data from a bus with bidirectional Cyclic Redundancy Check defined by eSATA in accordance with point-to-point transfer protocol;
a memory unit, for storing internal data of the information security device;
a privilege management unit, for managing and controlling privileges of a user that attempts access to the information security device by the user's identity;
an algorithm unit, for conducting encryption/decryption operations of data transmitted between the information security device and the host through key data stored in the memory unit, making use of the key data to execute secure authentication; and
a control unit, connected with the memory unit, the privilege management unit, the algorithm unit and the eSATA interface unit, for controlling communications between the eSATA interface unit and the host, controlling the privilege management unit with access to the information security device, and controlling and processing the data stored in the memory unit,
wherein the host supplies power to the information security device through the eSATA interface unit;
the host recognizes the information security device through the eSATA interface unit according to the external serial ATA protocol and allocates logic address and drive letter to the information security device;
the host sends operation instructions to the eSATA interface unit of the information security device for the service provided by the information security device; and
the information security device receives operation instructions sent by the host and returns execution result or information through the eSATA interface unit;
wherein the control unit is integrated with the memory unit, the privilege management unit, the algorithm unit and the eSATA interface unit into a single chip.

2. The portable information security device in accordance with claim 1, wherein the memory unit is further for storing key data consisting of digital certificates, keys and private user data.

3. The portable information security device in accordance with claim 1, wherein the memory unit is further for storing a user program to allow for writing and calling of user-defined algorithm(s).

4. The portable information security device in accordance with claim 2, wherein the algorithm unit conducts encryption/decryption operations with the key data.

5. The portable information security device in accordance with claim 1, 2, 3 or 4, wherein the control unit is a security design chip, consisting of a smart card chip.

6. The portable information security device in accordance with claim 1, 2, 3 or 4, wherein the chip is a security design chip consisting of a smart card chip.

7. The portable information security device in accordance with claim 1, 2, 3 or 4, wherein the eSATA interface unit is a separate eSATA protocol conversion chip.

* * * * *